United States Patent
Rebbecchi et al.

(10) Patent No.: US 11,819,919 B2
(45) Date of Patent: Nov. 21, 2023

(54) OXIDATION RESISTANT NICKEL BRAZE PUTTY

(71) Applicant: RTX Corporation, Farmington, CT (US)

(72) Inventors: Thomas Anthony Rebbecchi, West Hartford, CT (US); Paul M. Pellet, Arlington, TX (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 16/992,725

(22) Filed: Aug. 13, 2020

(65) Prior Publication Data
US 2021/0086311 A1 Mar. 25, 2021

Related U.S. Application Data

(60) Provisional application No. 62/903,264, filed on Sep. 20, 2019.

(51) Int. Cl.
| | |
|---|---|
| *B23K 35/00* | (2006.01) |
| *B22F 7/06* | (2006.01) |
| *B23K 1/20* | (2006.01) |
| *B23K 35/02* | (2006.01) |
| *B23K 35/30* | (2006.01) |
| *C22C 19/05* | (2006.01) |
| *B22F 1/107* | (2022.01) |
| *B22F 1/10* | (2022.01) |
| *B22F 1/00* | (2022.01) |

(52) U.S. Cl.
CPC .............. *B22F 7/062* (2013.01); *B22F 1/09* (2022.01); *B22F 1/10* (2022.01); *B22F 1/107* (2022.01); *B23K 1/20* (2013.01); *B23K 35/025* (2013.01); *B23K 35/304* (2013.01); *C22C 19/057* (2013.01)

(58) Field of Classification Search
CPC ............... B23K 35/304; B23K 1/20; B23K 35/0244–025; B23K 35/3033–3053; B23K 35/3613; B23K 1/0018; B23K 2101/001; C22C 19/057; B22F 7/062; B22F 2007/068; B22F 1/0074; B22F 1/0003; B22F 1/0059
USPC .................................. 228/119, 248.1–248.5
See application file for complete search history.

(56) References Cited

U.S. PATENT DOCUMENTS 4,478,638 A * 10/1984 Smith, Jr. et al. .... B22F 1/0003
228/119
4,910,098 A * 3/1990 Lee ....................... B22F 1/0003
228/262.31

(Continued)

FOREIGN PATENT DOCUMENTS

CN 105149597 B 9/2018
EP 1226896 A2 7/2002

(Continued)

OTHER PUBLICATIONS

European Search Report for European Application No. 20196225.5; Application Filing Date: Sep. 15, 2020; dated Nov. 12, 2020; 7 pages.

*Primary Examiner* — Kiley S Stoner
(74) *Attorney, Agent, or Firm* — CANTOR COLBURN LLP

(57) ABSTRACT

Disclosed is a braze putty composition including a sacrificial binder, a first nickel alloy and a second nickel alloy, a method of making the putty, and a method for using this putty to repair castings.

18 Claims, 2 Drawing Sheets

(56) References Cited

U.S. PATENT DOCUMENTS

| | | | |
|---|---|---|---|
| 5,040,718 A * | 8/1991 | Lee | F01D 5/005 |
| | | | 228/119 |
| 5,156,321 A * | 10/1992 | Liburdi | B23K 35/30 |
| | | | 228/175 |
| 6,530,971 B1 | 3/2003 | Cohen et al. | |
| 6,624,225 B1 * | 9/2003 | Ellison | B22F 1/0059 |
| | | | 524/434 |
| 7,199,174 B2 | 4/2007 | Ellison et al. | |
| 7,789,288 B1 * | 9/2010 | Johnson | C22C 19/05 |
| | | | 228/119 |
| 8,075,662 B2 | 12/2011 | Minor et al. | |
| 9,254,537 B2 | 2/2016 | Li et al. | |
| 2001/0036541 A1 * | 11/2001 | Makino | H01H 33/66261 |
| | | | 428/210 |
| 2004/0050909 A1 * | 3/2004 | Renteria | B22F 1/0003 |
| | | | 228/119 |
| 2004/0262366 A1 * | 12/2004 | Kinstler | B23K 35/0244 |
| | | | 228/119 |
| 2009/0220812 A1 * | 9/2009 | Kato | B23K 35/26 |
| | | | 428/548 |
| 2009/0266446 A1 * | 10/2009 | Minor | C22C 1/0433 |
| | | | 148/24 |
| 2013/0063862 A1 * | 3/2013 | Kim | H01G 4/30 |
| | | | 361/305 |
| 2015/0174707 A1 | 6/2015 | Li et al. | |
| 2017/0317048 A1 * | 11/2017 | Matsubara | H01L 24/83 |
| 2017/0327701 A1 * | 11/2017 | Connor | C09D 7/69 |
| 2018/0281124 A1 * | 10/2018 | Cui | B22F 7/008 |
| 2019/0001444 A1 * | 1/2019 | Kawaguchi | B23K 35/262 |

FOREIGN PATENT DOCUMENTS

| | | | | |
|---|---|---|---|---|
| EP | 2055424 A2 | | 5/2009 | |
| JP | 05325978 A | * | 12/1993 | H01M 4/80 |
| JP | 2013149855 A | * | 8/2013 | |
| WO | 9924214 A1 | | 5/1999 | |

* cited by examiner

OXIDATION RESISTANT NICKEL BRAZE PUTTY

CROSS REFERENCE TO RELATED APPLICATIONS

This application claims the benefit of U.S. Provisional Ser. No. 62/903,264, filed Sep. 20, 2019, the entire contents of which are incorporated herein by reference thereto.

BACKGROUND

Exemplary embodiments pertain to the art of braze materials.

Melt casting is used to fabricate intricate designs that forging or wrought alloy processing cannot produce. However, cast parts can contain defects that are artifacts of the casting process. These defects can be removed by mechanical means and the part repaired to yield a defect free part for use. When the defect is large and a substantial amount of material is removed by mechanical means, welding is typically the desired approach but can be unsuccessful depending on the alloy used to form the part. New approaches to repair complex cast parts are needed.

BRIEF DESCRIPTION

Disclosed is a braze putty composition including a sacrificial binder, a first nickel alloy and a second nickel alloy.

In addition to one or more of the features described above, or as an alternative to any of the foregoing embodiments, the sacrificial binder comprises an acrylic polymer having a glass transition temperature below about 20° C.

In addition to one or more of the features described above, or as an alternative to any of the foregoing embodiments, the first nickel alloy includes up to about 0.02 wt % of boron and the second nickel alloy includes boron in an amount no greater than 1.0 wt %.

In addition to one or more of the features described above, or as an alternative to any of the foregoing embodiments, the first nickel alloy includes about 4.75 wt %-10.5 wt % of chromium, about 5.5 wt %-6.7 wt % of aluminum, up to about 13 wt % cobalt, about 3.75 wt %-9.0 wt % of tantalum, about 1.3 wt %-2.25 wt % of molybdenum, about 3.0 wt %-6.8 wt % of tungsten, about 2.6 wt %-3.25 wt % of rhenium, up to about 0.02 wt % of boron, about 0.05 wt %-2.0 wt % of hafnium, up to about 0.14 wt % of carbon, up to about 0.35 wt % of zirconium, and a balance of nickel and the second nickel alloy includes about 21.25 wt %-22.75 wt % of chromium, about 5.7 wt %-6.3 wt % of aluminum, about 11.5 wt %-12.5 wt % of cobalt, about 5.7 wt %-6.3 wt % of silicon, boron in an amount no greater than 1.0 wt % or 0.45 wt %-0.55 wt % of boron as described above, and a balance of nickel.

In addition to one or more of the features described above, or as an alternative to any of the foregoing embodiments, the first nickel alloy is present in an amount of 20 to 80 weight percent and the second nickel alloy is present in an amount of 20 to 80 weight percent relative to the total amount of the first nickel alloy and the second nickel alloy.

In addition to one or more of the features described above, or as an alternative to any of the foregoing embodiments, the first nickel alloy is present in an amount of 60 weight percent and the second nickel alloy is present in an amount of 40 weight percent relative to the total amount of the first nickel alloy and the second nickel alloy.

In addition to one or more of the features described above, or as an alternative to any of the foregoing embodiments, the nickel alloys have regularly-shaped particles.

In addition to one or more of the features described above, or as an alternative to any of the foregoing embodiments, the nickel alloys are particles and the particles pass through a 325 mesh standard sieve.

In addition to one or more of the features described above, or as an alternative to any of the foregoing embodiments, the sacrificial binder is present in an amount of 5 to 8 weight percent of the combined weight of the first nickel alloy and the second nickel alloy.

Also disclosed is a method of making the braze putty composition as described above comprising: mixing a principle binder polymer with a solvent at a first speed to dissolve the principle binder polymer and form the sacrificial binder; and mixing first nickel alloy particulates and second nickel alloy particulates with the sacrificial binder at a second speed under vacuum, wherein the second speed is less than the first speed.

Also disclosed is a method of repairing a cast part including mechanically removing a defect or working a damaged area of a cast part to form a repair area; applying a braze putty to the repair area, wherein the braze putty comprises a sacrificial binder, a first nickel alloy and a second nickel alloy; removing the sacrificial binder and fusing the nickel alloys to the repair area of the cast part.

In addition to one or more of the features described above, or as an alternative to any of the foregoing embodiments, the sacrificial binder comprises an acrylic polymer having a glass transition temperature below about 20° C.

In addition to one or more of the features described above, or as an alternative to any of the foregoing embodiments, the first nickel alloy comprises up to about 0.02 wt % of boron and the second nickel alloy comprises boron in an amount no greater than 1.0 wt %.

In addition to one or more of the features described above, or as an alternative to any of the foregoing embodiments, the first nickel alloy comprises about 4.75 wt %-10.5 wt % of chromium, about 5.5 wt %-6.7 wt % of aluminum, up to about 13 wt % cobalt, about 3.75 wt %-9.0 wt % of tantalum, about 1.3 wt %-2.25 wt % of molybdenum, about 3.0 wt %-6.8 wt % of tungsten, about 2.6 wt %-3.25 wt % of rhenium, up to about 0.02 wt % of boron, about 0.05 wt %-2.0 wt % of hafnium, up to about 0.14 wt % of carbon, up to about 0.35 wt % of zirconium, and a balance of nickel and the second nickel alloy comprises about 21.25 wt %-22.75 wt % of chromium, about 5.7 wt %-6.3 wt % of aluminum, about 11.5 wt %-12.5 wt % of cobalt, about 5.7 wt %-6.3 wt % of silicon, boron in an amount no greater than 1.0 wt % or 0.45 wt %-0.55 wt % of boron as described above, and a balance of nickel.

In addition to one or more of the features described above, or as an alternative to any of the foregoing embodiments, the first nickel alloy is present in an amount of 20 to 80 weight percent and the second nickel alloy is present in an amount of 20 to 80 weight percent relative to the total amount of the first nickel alloy and the second nickel alloy.

In addition to one or more of the features described above, or as an alternative to any of the foregoing embodiments, the first nickel alloy is present in an amount of 60 weight percent and the second nickel alloy is present in an amount of 40 weight percent relative to the total amount of the first nickel alloy and the second nickel alloy.

In addition to one or more of the features described above, or as an alternative to any of the foregoing embodiments, the nickel alloys have regularly-shaped particles.

In addition to one or more of the features described above, or as an alternative to any of the foregoing embodiments, the nickel alloys are particles and the particles pass through a 325 mesh standard sieve.

In addition to one or more of the features described above, or as an alternative to any of the foregoing embodiments, the sacrificial binder is present in an amount of 5 to 8 weight percent of the combined weight of the first nickel alloy and the second nickel alloy.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
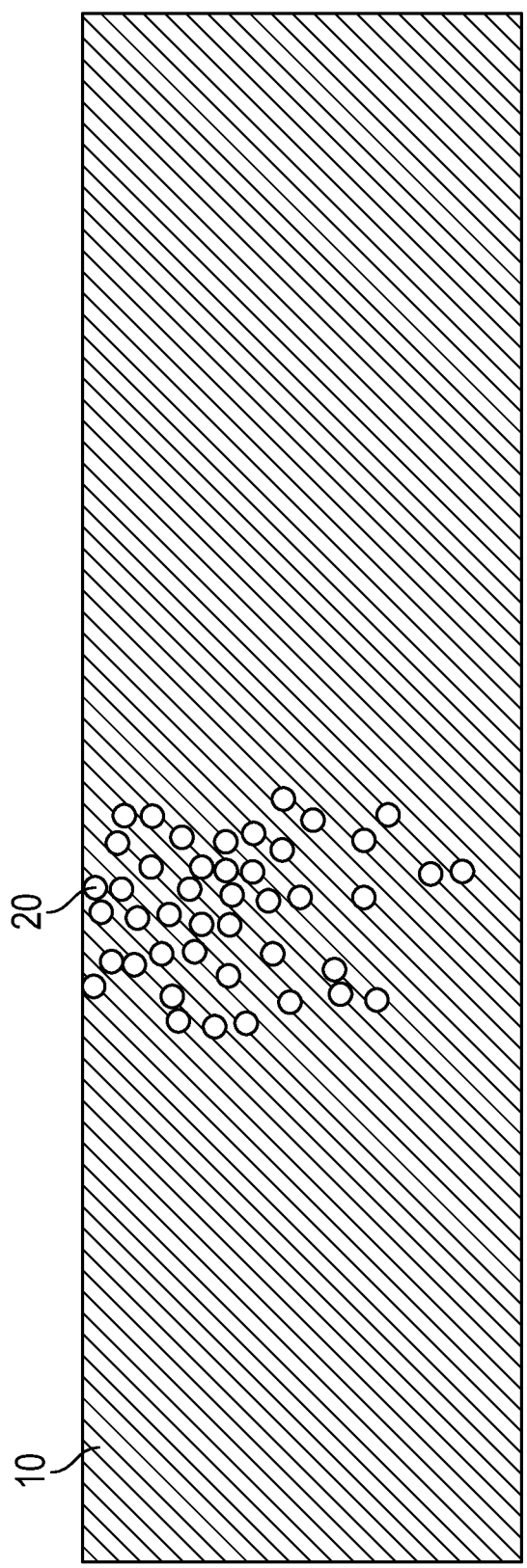
FIG. 1 is a representation of a casting with a defect.
Figure 2:
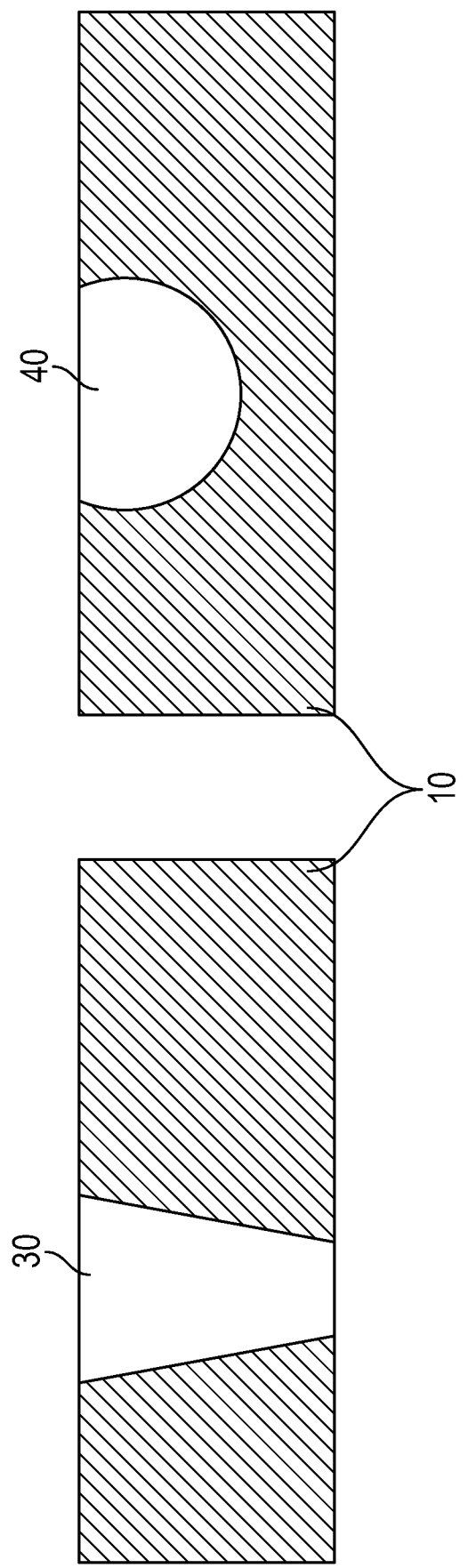
FIG. 2 is a representation of a casting which has had a defect mechanically removed.

Casting defects can include residual casting core material, dross, inclusions, porosity and the like. FIG. 1 shows a cast part 10 having a defect 20. To repair the cast part these defects are removed by mechanical means. Material removal can result in large voids such as through wall voids or dish outs. FIG. 2 shows a casting 10 having a through wall void 30 or a dish out 40. The material removed to form the void must be replaced in order to place the part in service. Methods for replacing the material depend on the size of the void. Small voids can be filled by brazing. Brazing with pastes and the like typically utilizes flow and capillary action to draw material into small areas such as cracks and small voids. These materials cannot be used to repair large areas because the material flows out of the larger area. Welding is typically used for larger voids but some alloys cannot be successfully welded. Brazing putty can be used for large voids but is limited in composition and does not provide sufficient environmental resistance for a true repair of a casting defect. It is expected that repairing a cast defect will produce a part that is equivalent to a cast part without a defect in all aspects, including environmental resistance. The braze putty is also useful for repairing damaged parts.

Described herein is a braze putty and a method of using it which can be used to repair casting defects and damage to produce a part with environmental resistance equivalent to a cast part without a casting defect.

The braze putty includes a sacrificial binder system, a first nickel alloy and a second nickel alloy.

The sacrificial binder system comprises a principle binder polymer and a solvent with a low vapor pressure, preferably less than about 20 mm Hg at 25° C. The principle binder polymer is a thermoplastic and has a softening or glass transition temperature (Tg) below about 20° C. Additionally, the sacrificial binder system may contain a plasticizer and a wetting agent. The low glass transition temperature of the principle binder polymer makes it soft and malleable at room temperature, while the low vaporization rate of the solvent contributes to wet tack, adhesion and a useful working life. When combined with alloy powders, these binder properties result in a braze putty with a consistency somewhat like modelling clay or adhesive putty.

The principle binder polymer may comprise an acrylic polymer or blend of acrylic polymers which provide a balance of cohesive strength or rigidity and softness or flexibility. For example, a tough, hard polymer which has good strength and a high softening temperature can be plasticized with a softer, more flexible polymer to give the desired properties. If the glass transition temperature of the principle binder polymer is low enough, it may even have a slight tacky feel even before solvents and plasticizers are added. Acrylic polymers have other desirable properties which make them useful as ingredients in the sacrificial binder system. For example, acrylic polymers remain stable above their softening range at temperatures up to 170-230° C. This property allows the selective removal of the solvent portion of the binder to take place by evaporation in air at temperatures up to 150° C., prior to vacuum furnace heat treatment. At higher temperatures (i.e. above 260° C., acrylics depolymerize to volatile monomers, leaving negligible ash or solid residue in the repair deposits. Some examples of acrylic polymers are methacrylate, methyl methacrylate, ethyl methacrylate, n-butyl methacrylate, isobutyl methacrylate, methyl/n-butyl methacrylate, n-butyl/isobutyl methacrylate, methyl/laurel methacrylate polymers and copolymers. It is preferred that the principle binder polymer make up 25-50% by weight of the sacrificial binder system and most preferably 30-40% of the sacrificial binder system.

The solvent used in conjunction with the sacrificial binder must be active, which is to say that it is capable of dissolving the principle binder polymer. Initially, the solvent contributes to the wet tackiness, softness, and moldability of the sacrificial binder system. After the braze putty has been applied to an article to be repaired or joined, the principle binder polymer is dried and hardened by evaporation of the solvent. Thus, the solvent must have a low volatility at room temperature in order to provide a useful working life (e.g. several hours) once it is exposed to the atmosphere, but substantially vaporize when heated to temperatures up to 200° C. When used in conjunction with the principle binder polymer, it is desirable that the solvent have a vapor pressure below 20 mm Hg at ambient temperature or below 1 mm Hg at ambient temperature. The solvent must vaporize completely and cleanly during air drying and vacuum furnace burn-out. Solvents which are useful in the sacrificial binder system are esters such as isoamyl acetate and isobutyl acetate, hydrocarbons, such as VM&P naptha and mineral spirits, and glycol ethers and acetates such as propylene glycol methyl ether, dipropylene glycol methyl ether, tripropylene glycol methyl ether, propylene glycol methyl ether acetate and dipropylene glycol methyl ether acetate. The solvent may make up 25-60% by weight or 30-45% by weight of the sacrificial binder system.

In addition to the principle binder polymer and solvent, the sacrificial binder system may optionally contain a plasticizer. The plasticizer further lowers the softening temperature of the principle binder polymer and provides added flexibility, softness and adhesion. The plasticizer must be chemically compatible (i.e. form solutions) with the principle binder polymer and solvent, sufficiently volatile to allow its removal during the vacuum furnace binder burnout process, but not sufficiently volatile to be substantially removed during mixing, storage, molding or air drying. The plasticizer must further completely decompose into gaseous, volatile species at high temperatures without leaving substantial level of solid residue. Exemplary plasticizers include phthalic and adipic esters. Some examples of phthalic esters which can be used to plasticize the acrylic principle binder polymers are alkyl benzyl phthalate, butyl benzyl phthalate, butyl octyl phthalate, dibutyl phthalate, dicyclohexyl phthalate, diethylphthalate, dihexyl phthalate, diisodecyl phthalate, di-2-methoxyethyl phthalate, dimethyl phthalate, ditridecyl phthalate, di-2-ethylhexyl phthalate, diisooctyl and mixed octyl phthalate, n-octyl n-decyl phthalate and isooctyl isodecyl phthalate. Some examples of adipic esters which can be used to plasticize acrylic polymers are dioctyl adipate, diisodecyl adipate, di-2-ethylhexyl adipate, octyl decyl adipate, diisobutyl adipate and diisooctyl adipate. The plasticizer may make up 0-30% by weight or 15-25% by weight of the sacrificial binder system.

Finally, the sacrificial binder polymer may, optionally, contain a wetting agent. The wetting agent lowers the surface tension of the binder system, promoting adhesion to the repair cavity or joint surfaces and dispersion of powder particles. The wetting agent must also be compatible with the other binder ingredients and burn out cleanly from the filler material leaving negligible ash or solid deposits. Exemplary wetting agents include nonyl or octyl phenol base nonionic surfactants. Some examples of nonyl phenol based surfactants are nonylphenol polyethylene glycol ether and nonylphenoxypolyethoxyethanol nonionic surfactant. An example of an octyl phenol base surfactant is octylphenoxypolyethoxyethanol nonionic surfactant. The wetting agent may make up 0-5% by weight of the sacrificial binder system and preferably 1-2% by weight of the sacrificial binder system.

The first nickel alloy may be a high melting temperature nickel alloy and the second nickel alloy may be a low melting temperature nickel alloy relative to the high melting temperature nickel alloy. That is, the first nickel alloy is a different chemical composition than the second nickel alloy. For instance, the first nickel alloy may have an equivalent composition to the nickel alloy substrate intended to for repair.

In one example, the first nickel alloy includes up to about 0.02 wt % of boron and the second nickel alloy includes boron in an amount no greater than 1.0 wt %. Boron contributes to lowering the melting temperature of nickel alloys but may be detrimental to forming a stable oxide scale relative to the nickel alloy substrate. Thus, using the relatively low level of boron in the second nickel alloy provides the benefit of a lower melting temperature for the brazing process and a combined composition of the blend that is relatively low in boron and capable of forming a stable oxide scale that functions as an oxygen barrier for enhanced environmental resistance. In a further example, the second nickel alloy may include about 0.45 wt %-0.55 wt % of boron, based on the total weight of the alloy to provide an even more stable oxide scale.

The first nickel alloy and the second nickel alloy may be of a variety of different compositions to facilitate enhanced environmental resistance. For example, the first nickel alloy may include about 4.75 wt %-10.5 wt % of chromium, about 5.5 wt %-6.7 wt % of aluminum, up to about 13 wt % cobalt, about 3.75 wt %-9.0 wt % of tantalum, about 1.3 wt %-2.25 wt % of molybdenum, about 3.0 wt %-6.8 wt % of tungsten, about 2.6 wt %-3.25 wt % of rhenium, up to about 0.02 wt % of boron, about 0.05 wt %-2.0 wt % of hafnium, up to about 0.14 wt % of carbon, up to about 0.35 wt % of zirconium, and a balance of nickel. The second nickel alloy may include about 21.25 wt %-22.75 wt % of chromium, about 5.7 wt %-6.3 wt % of aluminum, about 11.5 wt %-12.5 wt % of cobalt, about 5.7 wt %-6.3 wt % of silicon, boron in an amount no greater than 1.0 wt % or 0.45 wt %-0.55 wt % of boron as described above, and a balance of nickel.

As may be appreciated, any of the compositions of this disclosure may include other elements. Alternatively, any of the compositions of this disclosure may include only the elements listed in the particular composition. In another alternative, the compositions may include only other impurity elements that do not affect the properties of the alloy, such as oxidation tendencies, or elements that are unmeasured or undetectable in the alloy.

Additionally, the first nickel alloy may be any of the example compositions 1-5 in Table I below. In further examples, the first nickel alloy may be any of the example compositions 6-10 in Table II below, and the second nickel alloy may be the example composition 11 in Table II.

TABLE I

| | First Alloy Powder Composition (wt %) | | | | |
|---|---|---|---|---|---|
| Element | 1 | 2 | 3 | 4 | 5 |
| Cr | 6.6-7 | 6-6.8 | 6.6-7 | 7.75-5.25 | 9.5-10.5 |
| Al | 5.95-6.25 | 5.7-6.1 | 5.94-6.3 | 5.5-5.8 | 6.5-6.7 |
| Co | 11.5-12.5 | 12.1-13 | 11.45-12.05 | 9.5-10.5 | — |
| Ta | 6-6.6 | 3.75-4.25 | 6-6.6 | 8.4-9 | 3.9-4.3 |
| Mo | 1.3-1.7 | 1.5-1.9 | 1.3-1.7 | 1.7-2.1 | 1.75-2.25 |
| W | 4.7-5.1 | 6-6.8 | 4.7-5.1 | 5.6-6.2 | 3-3.4 |
| Re | 2.6-3 | 2.75-3.25 | 2.6-3 | 2.8-3.2 | — |
| Si | — | — | — | — | — |
| B | — | 0.01-0.15 | 0.01-0.02 | — | 0.004-0.01 |
| Hf | 1-1.4 | 1-2 | 1.3-1.7 | 0.05-0.15 | 1.05-1.25 |
| C | 0.1-0.14 | 0.08-0.12 | 0.1-0.14 | — | 0.08-0.13 |
| Zr | — | 0.04-.012 | — | — | 0.25-0.35 |
| Ni | Bal. | Bal. | Bal. | Bal. | Bal. |

TABLE II

| | First Alloy Powder Composition (wt %) | | | | | Second Alloy Powder Composition (wt %) |
|---|---|---|---|---|---|---|
| Element | 6 | 7 | 8 | 9 | 10 | 11 |
| Cr | 22 | 6.4 | 6.8 | 5 | 10 | 22 |
| Al | 6.1 | 5.9 | 6.12 | 5.65 | 6.6 | 6 |
| Co | 12 | 12.55 | 11.55 | 10 | — | 12 |
| Ta | 6.3 | 4 | 6.3 | 8.7 | 4.1 | — |
| Mo | 1.5 | 1.7 | 1.5 | 1.9 | 2 | — |
| W | 4.9 | 6.4 | 4.9 | 5.9 | 3.2 | — |
| Re | 2.8 | 3 | 2.8 | 3 | — | — |
| Si | — | — | — | — | — | 5.7-6.3 |
| B | — | 0.013 | 0.015 | — | 0.007 | 0.45-0.55 |
| Hf | 1.2 | 1.5 | 1.5 | 0.1 | 1.15 | — |
| C | 0.12 | 0.1 | 0.12 | — | 0.105 | 0.1 |
| Zr | — | 0.08 | — | — | 0.3 | 0.1 |
| Ni | Bal. | Bal. | Bal. | Bal. | Bal. | Bal. |

The blend may include 20 wt %-80 wt % of the first nickel alloy and 20 wt %-80 wt % of the second nickel alloy. For instance, the blend may exclusively include the first nickel alloy and the second nickel alloy such that the sum of the selected amounts totals 100 wt %. In another example, the blend may include only the first nickel alloy, the second nickel alloy, and a binder material. In a further example, the blend may include other constituents, but relative to a total amount of the first nickel alloy and the second nickel alloy, the blend includes 20 wt %-80 wt % of the first nickel alloy and 20 wt %-80 wt % of the second nickel alloy.

Within the ranges above, the blend may include any ratio of the first nickel alloy and the second nickel alloy (e.g., depending on the desired combined alloy composition, brazing process, or other parameters). For instance, the blend may include about 40 wt % of the first nickel alloy and about 60 wt % of the second nickel alloy, about 60 wt % of the first nickel alloy and about 40 wt % of the second nickel alloy, about 20 wt % of the first nickel alloy and about 80 wt % of the second nickel alloy, or about 80 wt % of the first nickel alloy and about 20 wt % of the second nickel alloy. In one example, the blend having about 60 wt % of the first nickel alloy and about 40 wt % of the second nickel alloy exhibits a desirable balance of braze processability and environmental resistance. Given this description, one of ordinary skill in the art will recognize desirable ratios of the first nickel alloy and the second nickel alloy to meet their particular needs.

The blend may have a variety of different combined alloy compositions, depending on the blend ratio and compositions of the first braze alloy and the second braze alloy. For example, the combined alloy composition may include about 8 wt %-20.3 wt % of chromium, about 5.5 wt %-6.7 wt % of aluminum, about 2.3 wt %-12.9 wt % of cobalt, about 0.7 wt %-7.2 wt % of tantalum, about 0.25 wt %-1.8 wt % of molybdenum, about 0.6 wt %-5.5 wt % of tungsten, up to 2.6 wt % of rhenium, about 1.1 wt %-5.1 wt % of silicon, boron in an amount no greater than 0.8 wt %, hafnium in an amount no greater than 1.6 wt %, up to about 0.12 wt % of carbon, up to about 0.3 wt % of zirconium, and a balance of nickel. For instance, the combined alloy composition of the blend may be any of the example compositions 12-15 in Table III below.

TABLE III

| | Combined Alloy Powder Composition (wt %) | | | |
|---|---|---|---|---|
| Element | 12 | 13 | 14 | 15 |
| Cr | 11.35-15.4 | 14.6-17.9 | 17.9-20.3 | 8.0-13.9 |
| Al | 5.5-6.6 | 5.6-6.5 | 5.6-6.4 | 5.5-6.7 |
| Co | 4.6-12.8 | 6.9-12.7 | 9.2-12.6 | 2.3-12.9 |
| Ta | 2.25-4 | 1.5-3.6 | 0.2-1.8 | 3.0-7.2 |
| Mo | 0.7-1.35 | 0.5-0.9 | 0.2-0.5 | 1.0-1.8 |
| W | 1.8-4.1 | 1.2-2.8 | 0.6-1.4 | 2.4-5.5 |
| Re | 2 max | 1.3 max | 0.7 max | 2.6 max |
| Si | 2.2-2.6 | 3.4-3.8 | 4.5-5.1 | 1.1-1.3 |
| B | 0.1-2.3 | 0.2-0.4 | 0.3-0.5 | 0.15 max |
| Hf | 0.03-1.2 | 0.02-0.8 | 0.4 max | 1.6 max |
| C | 0.1 max | 0.03-0.96 | 0.03 max | 0.06-0.15 |
| Zr | 0.25 max | 0.2 max | 0.1 max | 0.3 max |
| Ni | Bal. | Bal. | Bal. | Bal. |

In another example, the blend includes about 60 wt % of the first nickel alloy and about 40 wt % of the second nickel alloy and may have any of the example compositions 16-20 in Table IV below.

TABLE IV

| | 60 wt % First Powder/40 wt % Second Powder Combined Composition (wt %) | | | | |
|---|---|---|---|---|---|
| Element | 16 | 17 | 18 | 19 | 20 |
| Cr | 12.46-13.3 | 12.1-13.18 | 12.46-13.3 | 11.35-12.25 | 14.2-15.4 |
| Al | 5.85-6.27 | 5.7-6.18 | 5.84-6.3 | 5.58-6 | 6.18-6.54 |
| Co | 11.5-12.5 | 11.86-12.8 | 11.47-12.23 | 10.3-11.3 | 4.6-5 |
| Ta | 3.6-3.96 | 2.25-2.55 | 3.6-3.96 | 5.04-5.4 | 2.34-2.58 |
| Mo | 0.78-1.02 | 0.9-1.14 | 0.78-1.92 | 1.02-1.26 | 1.05-1.35 |
| W | 2.82-3.06 | 3.6-4.08 | 2.82-3.06 | 3.36-3.72 | 1.8-2.04 |
| Re | 1.56-1.8 | 1.65-1.95 | 1.56-1.8 | 1.68-1.92 | — |
| Si | 2.28-2.52 | 2.28-2.52 | 2.28-2.52 | 2.28-2.52 | 2.28-2.52 |
| B | 0.18-0.22 | 0.186-0.229 | 0.186-0.232 | 0.18-0.22 | 0.182-0.226 |
| Hf | 0.6-0.84 | 0.6-1.2 | 0.78-1.02 | 0.03-0.09 | 0.63-0.75 |
| C | 0.06-0.084 | 0.048-0.072 | 0.06-0.084 | — | 0.048-0.078 |
| Zr | — | 0.024-0.072 | — | — | 0.15-0.21 |
| Ni | Bal. | Bal. | Bal. | Bal. | Bal. |

In further examples, the blend may include about 40 wt % of the first nickel alloy and about 60 wt % of the second nickel alloy and may have any of the example compositions 21-25 in Table V below.

TABLE V

| | 40 wt % First Powder/60 wt % Second Powder Combined Composition (wt %) | | | | |
|---|---|---|---|---|---|
| Element | 21 | 22 | 23 | 24 | 25 |
| Cr | 15.39-16.45 | 15.15-16.37 | 15.39-16.45 | 14.65-15.75 | 16.55-17.84 |
| Al | 5.8-6.28 | 5.7-6.22 | 5.8-6.3 | 5.92-6.1 | 6.02-6.46 |
| Co | 11.5-12.5 | 11.74-12.7 | 11.48-12.32 | 10.7-11.7 | 6.9-7.5 |
| Ta | 2.4-2.64 | 1.5-1.7 | 2.4-2.64 | 3.36-3.6 | 1.56-1.72 |
| Mo | 0.52-0.68 | 0.6-0.76 | 0.52-0.68 | 0.68-0.84 | 0.7-1.2 |
| W | 1.88-2.04 | 2.4-2.72 | 1.88-2.04 | 2.24-2.48 | 1.2-1.36 |
| Re | 1.4-1.2 | 1.1-1.3 | 1.04-1.2 | 1.12-1.28 | — |
| Si | 3.42-3.78 | 3.42-3.78 | 3.42-378 | 3.42-3.78 | 3.42-3.78 |
| B | 0.27-0.33 | 0.274-0.336 | 0.274-0.338 | 0.27-0.33 | 0.272-0.334 |
| Hf | 0.4-0.56 | 0.4-0.8 | 0.52-0.68 | 0.02-0.06 | 0.42-0.5 |

TABLE V-continued

| | 40 wt % First Powder/60 wt % Second Powder Combined Composition (wt %) | | | | |
|---|---|---|---|---|---|
| Element | 21 | 22 | 23 | 24 | 25 |
| C | 0.04-0.056 | 0.032-0.048 | 0.04-0.056 | — | 0.032-0.052 |
| Zr | — | 0.016-0.048 | — | — | 0.1-0.14 |
| Ni | Bal. | Bal. | Bal. | Bal. | Bal. |

In another example, the blend includes about 20 wt % of the first nickel alloy and about 80 wt % of the second nickel alloy and may have any of the example compositions 26-30 in Table VI below.

TABLE VI

| | 20 wt % First Powder/80 wt % Second Powder Combined Composition (wt %) | | | | |
|---|---|---|---|---|---|
| Element | 26 | 27 | 28 | 29 | 30 |
| Cr | 18.32-19.6 | 18.2-19.56 | 18.32-19.6 | 17.95-19.25 | 18.9-20.3 |
| Al | 5.75-6.29 | 5.7-6.26 | 5.748-6.3 | 5.66-6.2 | 5.86-6.38 |
| Co | 11.5-12.5 | 11.62-12.6 | 11.49-12.41 | 11.1-12.1 | 9.2-10.0 |
| Ta | 1.2-1.32 | 0.75-0.85 | 1.2-1.32 | 1.68-1.8 | 0.78-0.86 |
| Mo | 0.26-0.34 | 0.3-0.38 | 0.26-0.34 | 0.34-0.42 | 0.35-0.45 |
| W | 0.94-1.02 | 1.2-1.36 | 0.94-1.02 | 1.12-1.24 | 0.6-0.68 |
| Re | 0.52-0.6 | 0.55-0.65 | 0.52-0.6 | 0.56-0.64 | — |
| Si | 4.56-5.04 | 4.56-5.04 | 4.56-5.04 | 4.56-5.04 | 4.56-5.04 |
| B | 0.36-.044 | 0.362-0.443 | 0.362-0.444 | 0.36-0.44 | 0.361-0.442 |
| Hf | 0.2-0.28 | 0.2-0.4 | 0.26-0.34 | 0.01-0.03 | 0.21-0.25 |
| C | 0.02-0.028 | 0.016-0.024 | 0.02-0.028 | — | 0.016-0.026 |
| Zr | — | 0.008-0.024 | — | — | 0.05-0.07 |
| Ni | Bal. | Bal. | Bal. | Bal. | Bal. |

In another example, the blend includes about 80 wt % of the first nickel alloy and about 20 wt % of the second nickel alloy and may have any of the example compositions 31-35 in Table VII below.

TABLE VII

| | 80 wt % First Powder/20 wt % Second Powder Combined Composition (wt %) | | | | |
|---|---|---|---|---|---|
| Element | 31 | 32 | 33 | 34 | 35 |
| Cr | 9.53-10.15 | 9.05-9.99 | 9.53-10.15 | 8.05-8.75 | 11.85-12.95 |
| Al | 5.9-6.24 | 5.7-6.14 | 5.892-6.3 | 5.54-5.9 | 6.34-6.62 |
| Co | 11.5-12.5 | 11.98-12.9 | 11.46-12.14 | 9.9-10.9 | 2.3-2.5 |
| Ta | 4.8-5.28 | 3.0-3.4 | 4.8-5.28 | 6.72-7.2 | 3.12-3.44 |
| Mo | 1.04-1.36 | 1.2-1.52 | 1.04-1.36 | 1.36-1.68 | 1.4-1.8 |
| W | 3.76-4.08 | 4.8-5.44 | 3.76-4.08 | 4.48-4.96 | 2.4-2.72 |
| Re | 2.08-2.4 | 2.2-2.6 | 2.08-2.4 | 2.24-2.56 | — |
| Si | 1.14-1.26 | 1.14-1.26 | 1.14-1.26 | 1.14-1.26 | 1.14-1.26 |
| B | 0.09-0.11 | 0.098-0.122 | 0.098-0.126 | 0.09-0.11 | 0.093-0.118 |
| Hf | 0.8-1.12 | 0.8-1.6 | 1.04-1.36 | 0.04-0.12 | 0.84-1.0 |
| C | 0.08-0.112 | 0.064-0.096 | 0.08-0.112 | — | 0.064-0.104 |
| Zr | — | 0.032-0.096 | — | — | 0.2-0.28 |
| Ni | Bal. | Bal. | Bal. | Bal. | Bal. |

The nickel alloys preferably have spherical or at least regularly-shaped particles since they form smoother, more uniform putty mixtures. Irregular or agglomerated powder particles require larger amounts of binder and do not form smooth, homogeneous mixtures. In some embodiments, the particulate material will pass through a 325 mesh standard sieve. Particles which are substantially coarser than that (do not pass through 325 mesh standard sieve) may result in putty mixtures which have a granular texture and do not flow as smoothly to fill repair cavities. A fine particle size also promotes sintering and solid-state bonding of the filler powder to adjacent surfaces during removal of the last binder components in the vacuum furnace.

In preparing the putty, the ratio of the sacrificial binder to the particulate alloy may be controlled to produce the desired properties. The most preferred sacrificial binder/powder composition corresponds to that in which there is just enough binder present to fill the interstitial spaces between the alloy powder particles. At this composition, which is known as the critical loading point, the alloy powder particles are in an optimal packing arrangement which results in point-to-point contact between adjacent particles. This is also the composition at which the putty attains the highest viscosity and resistance to flow or deformation. The critical loading composition thus attains the greatest gravitational and dimensional stability, thereby preventing shrinkage and slumping of the filler material after it is applied. The critical loading composition can be estimated using theoretical models which are based on the characteristics of the particulate material, but can also be identified using simple tests derived from paint technology. Essentially, the sacrificial binder is added incrementally to the particulate material and mixed by hand until the mixture loses its granular texture and can be spatulated into a stiff, but coherent paste. Expressed in terms of weight percentages, the critical loading composition typically corresponds to 5 to 8% of the combined nickel alloy weight.

Preparing the putty includes premixing and dissolving the sacrificial binder ingredients, followed by the addition and mixing of the particulate alloy. Premixing the binder ingredients results in rapid and complete dissolution of the principle binder polymer, solvent, plasticizer and wetting agent. The latter process can be accomplished using a high speed (4,000 to 10,000 rpm) impeller mixer. Mixing and dispersion of the particulate material with the sacrificial binder is may be accomplished at slower speeds (25-70 rpm) in a vacuum shear mixer. Vacuum mixing is used to prevent the entrapment of air within the filler material which could lead to voids in the finished repair deposits.

It is further contemplated that the braze putty may be made in a two-part formulation, Part A and Part B. Part A includes sacrificial binder and the first nickel alloy. Part B includes sacrificial binder and the second nickel alloy. The ratio of these two putty components, Part A:Part B, is controlled to be in the range from 5:1 to 1:3, depending on the properties required in the final repair deposit and the processing characteristics of the alloy powders when they are used to repair or join the metal articles.

The braze putty may be used with cast parts made from a nickel super alloy.

As mentioned above the defect may be removed by mechanical means. Similarly a damaged area may be worked mechanically to expose area suitable for repair. The exposed area is cleaned via chemical or physical methods to ensure an appropriate surface for bonding. The braze putty is applied and worked into a repair cavity or joint usually light pressure. Care is taken to eliminate any voids or areas of non-contact between the filler and the joint surfaces which could lead to defects in the article after thermal processing. The surface of braze putty is molded into a desirable near-net-shape which substantially corresponds to the original surface contours of the article, thereby reducing the amount of time required to blend and finish the surface of the joint after heat treatment.

After it is applied, the braze putty is dried in an air oven in order to remove the solvent component of the sacrificial binder. This process also hardens the filler deposit and renders it porous so that the remainder of the binder system can be removed in a subsequent vacuum heat treatment operation without causing internal pressure build-up or defect formation due to entrapped vapors. When raising the temperature of the article in an air drying oven, the rate of heating and solvent removal is controlled to avoid distortion, slumping or the formation of gas porosity within the putty deposit. An exemplary drying cycle includes raising the temperature of the air drying oven to 60-80° C. at a rate of 5 to 10° C. per minute. After holding at this temperature for 2 to 6 hours, the temperature is raised at the same rate to 130-160° C. and held for another 2-6 hours.

Once the filler deposits have been dried, the remainder of the sacrificial binder ingredients are removed by thermal decomposition and vaporization in a vacuum brazing or sintering furnace. Complete vaporization and elimination of the last binder ingredients of the present invention usually occurs at temperatures below 500° C. After this exposure, all solid organic residues are substantially eliminated from the repair joint, leaving only the metallic alloy powder materials which are then melted and fused or sintered by further increases in temperature.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A two-part formulation for a braze putty composition comprising:
  a first part of the two-part formulation comprising sacrificial binder and a first nickel alloy, and a second part of the two-part formulation comprising sacrificial binder and a second nickel alloy;
  wherein the first nickel alloy comprises about 4.75 wt %-10.5 wt % of chromium, about 5.5 wt %-6.7 wt % of aluminum, up to about 13 wt % cobalt, about 3.75 wt %-9.0 wt % of tantalum, about 1.3 wt %-2.25 wt % of molybdenum, about 3.0 wt %-6.8 wt % of tungsten, about 2.6 wt %-3.25 wt % of rhenium, up to about 0.02 wt % of boron, about 0.05 wt %-2.0 wt % of hafnium, up to about 0.14 wt % of carbon, up to about 0.35 wt % of zirconium, and a balance of nickel and the second nickel alloy comprises about 21.25 wt %-22.75 wt % of chromium, about 5.7 wt %-6.3 wt % of aluminum, about 11.5 wt %-12.5 wt % of cobalt, about 5.7 wt %-6.3 wt % of silicon, boron in an amount no greater than 1.0 wt % or 0.45 wt %-0.55 wt % of boron, and a balance of nickel; and
  wherein the ratio of the first part to the second part of the two-part formulation is 5:1.

2. The braze putty composition of claim 1, wherein the sacrificial binders of the first and second parts each comprise an acrylic polymer having a glass transition temperature below about 20° C.

3. The braze putty composition of claim 1, wherein the first nickel alloy comprises up to about 0.02 wt % of boron and the second nickel alloy comprises boron in an amount no greater than 1.0 wt %.

4. The braze putty composition of claim 1, wherein the first nickel alloy is present in an amount of 20 to 80 weight percent and the second nickel alloy is present in an amount of 20 to 80 weight percent relative to the total amount of the first nickel alloy and the second nickel alloy.

5. The braze putty composition of claim 4, wherein the first nickel alloy is present in an amount of 60 weight percent and the second nickel alloy is present in an amount of 40 weight percent relative to the total amount of the first nickel alloy and the second nickel alloy.

6. The braze putty composition of claim 1, wherein the nickel alloys have spherical particles.

7. The braze putty composition of claim 1, wherein the nickel alloys are particles and the particles pass through a 325 mesh standard sieve.

8. The braze putty composition of claim 1, wherein the sacrificial binders of the first and second parts are present in an amount of 5 to 8 weight percent of the combined weight of the first nickel alloy and the second nickel alloy.

9. A method of making the braze putty composition of claim 1 comprising:
  mixing a principle binder polymer with a solvent at a first speed to dissolve the principle binder polymer and form the sacrificial binder of the first part; and
  mixing first nickel alloy particulates with the first sacrificial binder of the first part at a second speed under vacuum, wherein the second speed is less than the first speed.

10. A method of repairing a cast part comprising:
mechanically removing a defect or working a damaged area of a cast part to form a repair area;
  providing a two-part formulation for a braze putty, and forming the braze putty from the two-part formulation, a first part of the two-part formulation comprising sacrificial binder and a first nickel alloy, and a second part of the two-part formulation comprising sacrificial binder and a second nickel alloy;
  applying the braze putty to the repair area; and
  removing the sacrificial binders and fusing the first and second nickel alloys;
  wherein the first nickel alloy comprises about 4.75 wt %-10.5 wt % of chromium, about 5.5 wt %-6.7 wt % of aluminum, up to about 13 wt % cobalt, about 3.75 wt %-9.0 wt % of tantalum, about 1.3 wt %-2.25 wt % of molybdenum, about 3.0 wt %-6.8 wt % of tungsten, about 2.6 wt %-3.25 wt % of rhenium, up to about 0.02 wt % of boron, about 0.05 wt %-2.0 wt % of hafnium, up to about 0.14 wt % of carbon, up to about 0.35 wt % of zirconium, and a balance of nickel and the second nickel alloy comprises about 21.25 wt %-22.75 wt % of chromium, about 5.7 wt %-6.3 wt % of aluminum, about 11.5 wt %-12.5 wt % of cobalt, about 5.7 wt %-6.3 wt % of silicon, boron in an amount no greater than 1.0 wt % or 0.45 wt %-0.55 wt % of boron, and a balance of nickel; and
  wherein the ratio of the first part to the second part of the two-part formulation is 5:1.

11. The method of claim 10, wherein the sacrificial binders of the first and second parts each comprise an acrylic polymer having a glass transition temperature below about 20° C.

12. The method of claim 10, wherein the first nickel alloy comprises up to about 0.02 wt % of boron and the second nickel alloy comprises boron in an amount no greater than 1.0 wt %.

13. The method of claim 10, wherein the first nickel alloy is present in an amount of 20 to 80 weight percent and the second nickel alloy is present in an amount of 20 to 80 weight percent relative to the total amount of the first nickel alloy and the second nickel alloy.

14. The method of claim 13, wherein the first nickel alloy is present in an amount of 60 weight percent and the second nickel alloy is present in an amount of 40 weight percent relative to the total amount of the first nickel alloy and the second nickel alloy.

15. The method of claim 10, wherein the nickel alloys have spherical particles.

16. The method of claim 10, wherein the nickel alloys are particles and the particles pass through a 325 mesh standard sieve.

17. The method of claim 10, wherein the sacrificial binders of the first and second parts are present in an amount of 5 to 8 weight percent of the combined weight of the first nickel alloy and the second nickel alloy.

18. A two-part formulation for a braze putty composition comprising:
  a first part of the two-part formulation comprising sacrificial binder and a first nickel alloy, and a second part of the two-part formulation comprising sacrificial binder and a second nickel alloy;

wherein the first nickel alloy comprises about 4.75 wt %-10.5 wt % of chromium, about 5.5 wt %-6.7 wt % of aluminum, up to about 13 wt % cobalt, about 3.75 wt %-9.0 wt % of tantalum, about 1.3 wt %-2.25 wt % of molybdenum, about 3.0 wt %-6.8 wt % of tungsten, about 2.6 wt %-3.25 wt % of rhenium, up to about 0.02 wt % of boron, about 0.05 wt %-2.0 wt % of hafnium, up to about 0.14 wt % of carbon, up to about 0.35 wt % of zirconium, and a balance of nickel and the second nickel alloy comprises about 21.25 wt %-22.75 wt % of chromium, about 5.7 wt %-6.3 wt % of aluminum, about 11.5 wt %-12.5 wt % of cobalt, about 5.7 wt %-6.3 wt % of silicon, boron in an amount no greater than 1.0 wt % or 0.45 wt %-0.55 wt % of boron, and a balance of nickel; and wherein the ratio of the first part to the second part of the two-part formulation is 1:3.

\* \* \* \* \*